Figure 1:
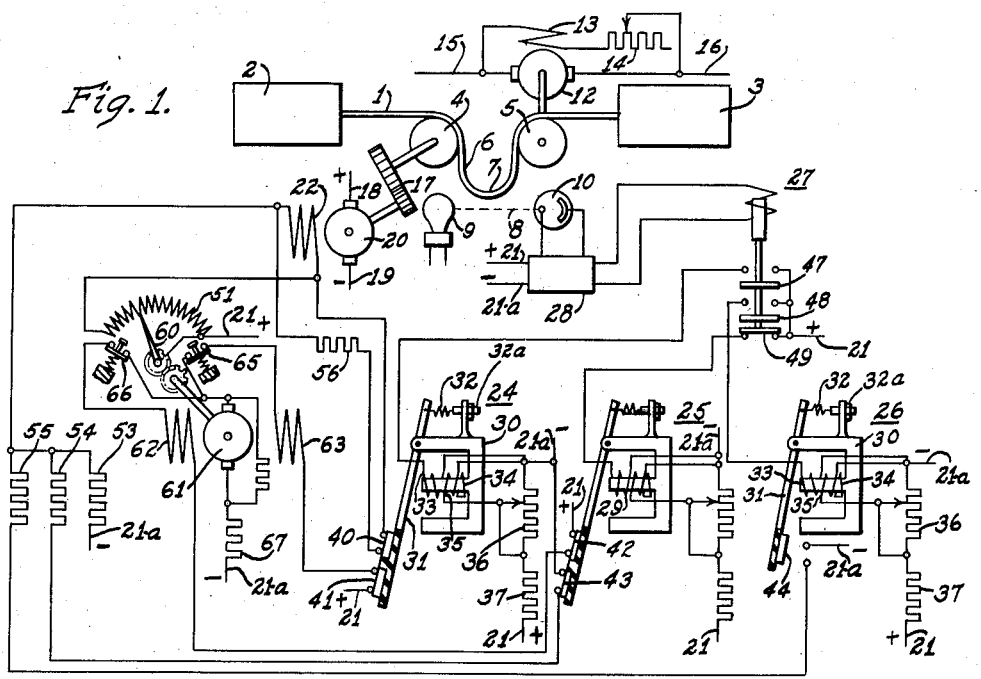

Feb. 14, 1939.   J. G. STEPHENSON   2,147,467
LOOP REGULATOR
Filed Dec. 17, 1937

WITNESSES:
Leon M. Garman
J. K. Foster

INVENTOR
James G. Stephenson
BY
Paul C. Friedemann
ATTORNEY

Patented Feb. 14, 1939

2,147,467

UNITED STATES PATENT OFFICE 2,147,467

LOOP REGULATOR

James G. Stephenson, Wilkinsburg, Pa., assignor to Westinghouse Electric & Manufacturing Company, East Pittsburgh, Pa., a corporation of Pennsylvania Application December 17, 1937, Serial No. 180,411

11 Claims. (Cl. 271—2.3)

This invention relates, in general, to control systems, and particularly to systems in which a web-like material, such as paper or the like, is transferred from a delivering member to a spaced receiving member in such manner as to provide for some slack in the form of a depending loop between the delivering member and the receiving member.

In various types of machinery in which web-like material is treated, and particularly in a paper treating machine, the paper is coated in one section of the machine and is then transferred to another section of the machine for drying. In order to provide for a certain amount of flexibility in the relation between the movements of the paper in the two parts of the machine, it is desirable to permit a certain amount of slack in the paper in the form of a loop between the two sections of the machine. The amount of slack or the size of the loop should be kept within a predetermined average, however, and not permitted to become too little or too much.

One object of my invention, therefore, is to provide for transferring material from a delivering means to a receiving means with a slack loop in the material between the two means, and to provide for so regulating the speed of the delivering means relative to the receiving means that the sag of the slack will be maintained reasonably constant according to a predetermined average depth.

Another object of my invention is to provide a system in which relatively rugged relays may be employed to regulate the speed of an operating motor for the delivering means.

Another object of the invention is to provide a system in which high speed electronic devices are employed to detect a variation or departure of the sag from the desired predetermined average depth, but in which relatively slow restoring equipment is initially employed when the sag departs from the predetermined permitted depth, and in which relatively high speed equipment is also provided, but resorted to only if the relatively slow speed equipment does not function to restore the sag to the desired average depth within a fixed interval of time after the departure from such average.

In United States Patent No. 2,011,653 of A. S. Rufsvold, issued August 20, 1935, to the same assignee as that of this application, there is shown a system for maintaining the slack loop or sag in a material to be transmitted between two reels in such manner as to prevent the sag from becoming too short or too long. The speeds of both reels are related, and the speed of the main motor for driving one reel is controlled by the constant automatic adjustment of a motor operated field rheostat.

A motor operated field rheostat for automatically controlling the excitation of a field winding is relatively expensive and if subjected to continuous operation for automatically controlling the excitation of the field winding, the rheostat will become excessively used and worn. In order to extend the life of such expensive equipment, I provide a system in which the continuous regulating operation may be performed by less expensive and more rugged devices, with the motor operated rheostat kept available as a back-up device to supplement the inexpensive devices in their control operations only if and when such less expensive devices fail to accomplish their intended operations within a predetermined permitted safety period.

Where photo-electric tubes are employed as detectors to detect a deviation or departure of an article or member from a predetermined desired position, the relatively instantaneous detecting qualities of the photo-electric cell would cause correspondingly rapid operation of control equipment if permitted. As a result of such high speed operation, the regulating equipment or devices and particularly the contact members thereof would be subjected to a great deal more service and wear than would be necessary to accomplish commercially satisfactory results in maintaining the movable member within a desired average range of movement and without excessive deviation or departure from such average range.

In order to accomplish such relatively slow control that would be commercially satisfactory, suitable rugged devices with relatively slow operating intervals may be provided and employed. The trouble might be, however, that a started deviation or departure from the desired average might not be counteracted, and the movable material restored to the average position within a predetermined time interval necessary for the proper and safe operation of the apparatus. It is, therefore, necessary when such relatively slow control equipment is employed, that would be otherwise sufficiently satisfactory for commercial purposes, that some means be provided to establish a relatively quick restoring action to keep the equipment operating within the proper safety range. In the present system in accordance with the principle of my invention, I employ relatively slow equipment for normally controlling the slack loop to maintain an average sag, and also provide a simple arrangement whereby other already available equipment of the system may be controlled to establish an extremely rapid restoring action to restore the slack loop or sag to the desired range within a predetermined safety interval of time.

Figure 2:
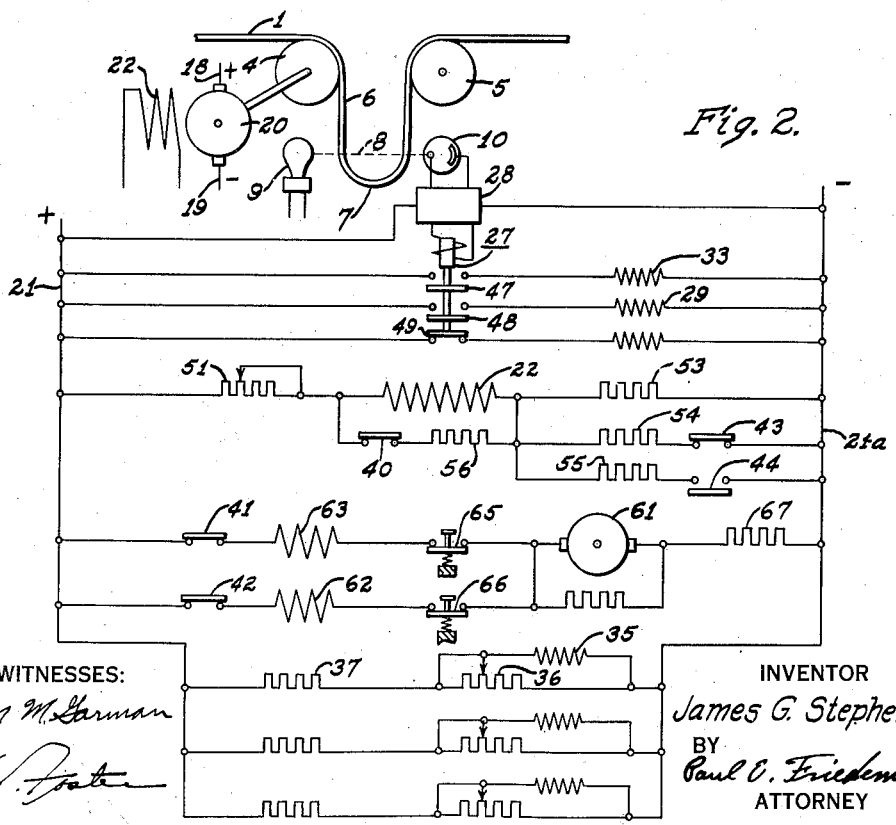

The system to which I have applied the principle of my invention is illustrated in the accompanying diagrams, wherein Figure 1 schematically illustrates the various elements in operative relation, whereas Fig. 2 is an engineer's straight-line diagram illustrating the various elements so that their circuits may be more readily traced.

As shown in the diagrams, a web-like material 1, such as paper or the like which is to be moved from one machine or part of a machine 2, to another machine or to another part of a machine 3, is arranged to be passed over motion controlling means such as a delivery means or roll 4, and a receiving means or roll 5. The two rolls 4 and 5 are spaced in such manner as to permit the web-like material such as rubber, asbestos paper, or paper 1 to sag between the two rolls to form a slack loop 6. The permitted slack loop length is predetermined so that the lower portion or bight 7 of the loop shall be maintained substantially in an average position along a zone indicated by the dotted line 8.

In order to control the extent of sag of the slack loop with respect to such average position, as indicated by the dotted line 8, a photocell system is correspondingly disposed with its line of action coinciding with the line 8 that is to determine the average location of the slack loop 6. The photo-electric system consists of the usual source of light 9 and a photo-cell 10 disposed in spaced relation so that the slack loop may move into position between the light 9 and the cell 10 to interrupt the light rays from the light source to the cell.

During the normal operation of the machine, the delivery roll 4 removes the material 1 from the corresponding machine, or part of the machine 2, and the receiving roll 5 receives and transfers the material to the corresponding part of the machine 3. The receiving roll 5 is operated by a suitable motor indicated simply as a direct current motor 12 provided with a shunt field winding 13 that is controlled by an adjustable field rheostat 14, with the motor energized from a suitable source of energy indicated by conductors 15 and 16. In this application, I am not particularly concerned with the control of the receiving motor 12, but assume for the purposes of the application that it is controlled to operate at a substantially constant speed to supply the material, such as the paper 1, to the drying section 3 of the machine.

In normal operation, the delivery roll 4 is operated through a suitable speed-reducing device 17 by a direct current motor 20 which is energized from a suitable source of direct current energy 21 of proper voltage, indicated merely by the connection of the brushes at the armature winding to the conductors 18 and 19 of opposite polarities. The motor 20 is provided with the usual shunt field winding 22 to control the speed of the motor 20 in order to maintain the slack loop at the desired depth.

The speed of the delivery motor 20 is controlled by controlling the excitation of the shunt field winding 22. Such control is procured through the cooperation of three timing relays 24, 25 and 26, and these, in turn, are controlled or initiated by a main relay 27, which in turn is controlled by the photo-electric cell 10 and a suitable amplifying control system 28 indicated merely as a rectangle.

The details of the photo-electric control system indicated schematically by the rectangle 28 are not specifically my invention, and need not be specifically described here, since it is sufficient merely to indicate that the excitation of the photo-cell 10 by light from the lamp 9 will deenergize the relay 27, and darkness in the photo-cell 10 by reason of the drooping slack loop 6 will cause the energization of the relay 27. The particular system which I employ as the photo-cell system in the rectangle 28 is described and claimed in United States Patent No. 2,033,016, issued March 3, 1936 upon an application of Edwin H. Vedder and assigned to the present assignee.

The timing relays 24, 25 and 26 are described and claimed in United States Patent 1,753,983 of W. G. Cook, issued April 8, 1930, to the present assignee.

For the purpose of the present application it is sufficient merely to describe briefly the details and manner of operation of the timing relays 24, 25 and 26. As illustrated, each relay comprises a core 30 of E-shape with a movable armature 31 pivotally supported at the end of one leg of the core in such manner that when attracted to the core, the armature will engage the three legs of the core to establish a substantially closed magnetic circuit. The armature when so attracted will move against the restraining force of an adjustable biasing spring 32 disposed between a projecting arm of the pivoted armature and a spring tension adjusting screw 32—a mounted on a stationary part of the core frame. The middle leg of the core supports three windings, one a main operating winding 33, a short circuited winding 34 and the other a neutralizing winding 35 to buck out or neutralize the residual magnetic flux that would otherwise normally remain in the magnetic circuit including the core on the armature, when the main winding 33 is deenergized. The neutralizing winding 35 is normally continuously energized, but only to a relatively small degree such as may be necessary merely to neutralize the small amount of residual magnetism that would be established and left in the relay magnetic circuit after the main winding is deenergized. The neutralizing winding 35 has very little effect in slowing up the operation of the relay when the main operating winding 33 is energized. Thus when the relay is to be operated, the main winding 33 is energized and immediately attracts the armature to the energized position of the relay. When the circuit of the energizing winding 33 is opened, the decay of the magnetic flux is slowed down by winding 34 until the normal residual flux value is attained. In the absence of the neutralizing winding 35, such residual flux would be sufficient to maintain the armature 31 at its attracted position against the restoring force of the reset biasing spring 32. However, inasmuch as the neutralizing winding 35 is continuously energized, it begins to neutralize the residual flux as soon as the main winding 33 is deenergized. The time required for the complete decay of the flux to a value which may then be overcome by the restoring spring 32 constitutes the time element of the relay.

The time element of the relay may be further adjusted, for a particular adjustment of the reset spring, by controlling the extent of excitation of the neutralizing winding 35 by means of a movable tap or a potentiometer resistor 36 across which the neutralizing winding 35 is normally connected. The potentiometer resistor 36 is connected in series with a resistor 37 having a relatively high resistance value to the suitable energizing circuit indicated by buses 21 and 21—a.

Each of the timing relays 24, 25 and 26 is provided with an operating mechanism or armature that is similar in construction. The three relays are provided with different sets of contacts, however, as illustrated in the diagram. The timing relay 24 is provided with a pair of back contacts 40 and 41.

The timing relay 25 is provided with a similar pair of back contacts 42 and 43. The timing relay 26 is provided with a single front contact 44.

For the sake of illustration, the timing relay 24 will be assumed to have a resetting time interval of one second, that is, after the main winding 33 is deenergized, one second will elapse before the residual magnetism is neutralized sufficiently to permit the relay armature to be released from the core and to close the switch contacts 40 and 41. The timing relay 25 will be assumed to have a resetting time interval of two seconds, and the timing relay 26 will also be assumed to have a resetting interval of two seconds.

The energization of the three timing relays is controlled by the main relay 27, which is provided for that purpose with two front contacts 47 and 48, and one back contact 49.

We may now return to the consideration of the shunt field winding of the motor for the delivery roll 4 to observe how the timing relays control the excitation of the shunt field winding 22.

Other elements associated with the shunt field windings will be first referred to in order to clarify the manner of operation. As shown, the shunt field winding 22 is connected to one terminal of a motor-operated rheostat 51, the other terminal of the rheostat being connected to the positive conductor of the source of direct-current energy shown by the buses, or conductors 21 and 21—a. The other conductor of the field winding 22 is connected to three resistor elements 53, 54 and 55 at one terminal of each of the resistors. The other terminal of the resistor 53 is connected to the negative conductor 21—a of the circuit 21. The other terminal of the resistor 54 is connected through the back contact 43 of timing relay 25 to the negative conductor 21—a of the circuit 21. The other conductor of the resistor 55 is connected through the front contact 44 of the timing relay 26 to the negative conductor 21—a of circuit 21. An additional resistor 56 is arranged to be connected in parallel with the shunt field winding 22 by the back contact 40 of the timing switch 24.

The field rheostat 51 for controlling the excitation of the shunt field winding 22 is motor operated as illustrated, and is operated in the usual manner by a contacting arm 60 moving along the resistor 51 to control the total resistance of the circuit including the field winding 22. The arm 60 is connected at its pivoted end to one terminal of the rheostat 51 which in turn is connected to the positive conductor 21 of the energizing circuit. The operating motor for the rheostat comprises the usual armature 61 and two field windings 62 and 63, by means of which the reverse operation of the motor may be effected. In order to limit the movement of the rheostat arm 60, two limit switches 65 and 66 are provided at the respective ends of the path of travel of the rheostat arm. The two limit switches are respectively connected in series circuit relation with the two field windings of the rheostat motor. Each switch will open the circuit to deenergize the corresponding winding and to open the motor armature circuit to thus discontinue the operation of the motor when the arm reaches the switch at that terminal position.

As shown, the circuit for the field winding 62 proceeds from positive bus 21 through back contact 42, the field winding 62, limit switch 66, the armature of motor 61 and resistor 67 to the negative conductor 21—a. The circuit of the other field winding 63 proceeds from positive bus 21 through back contact 41, field winding 63, the limit switch 65, the armature of motor 61 and resistor 67 to the negative conductor 21—a.

The operation of the system may now be considered.

All the equipment is shown in deenergized condition except the photo-cell 10 and light 9, which are lighted. Relay 27 is deenergized and consequently timing relays 24, 25 and 26 are in their respective deenergized positions, as illustrated.

We shall assume starting the system from rest with everything in the positions illustrated. The slack loop is up and photo-cell 10 energized and relay 27 deenergized. The buses 21 and 21—a are energized, whereupon several circuits will be immediately energized. The main winding 29 of the timing relay 25 is now immediately energized since it is connected through the back contact 49 of the main relay 27 to the buses 21 and 21—a. The timing relay 25 immediately operates and opens the circuits controlled by its back contacts 42 and 43.

The timing switch 24 is, and remains, deenergized and its back contacts 40 and 41 are closed. The circuits controlled by those two back contacts are also, therefore, closed and energized. As shown, the circuit for the field winding 63 of the rheostat motor is now energized by a circuit proceeding from the positive bus 21 through the back contact 41 of timing relay 24, through field winding 63 of the rheostat motor, through the limit switch 65, through the motor 61 and the resistor 67 to the negative conductor 21—a. As already observed, the circuit of the other field winding 62 is opened at the back contact 42 of the timing relay 25 which is in its energized position. The other closed circuit controlled by the back contact 40 of the timing relay 24 is the circuit including the resistor 56 to bridge the shunt field winding 22 of the main motor 20 for the roll 4. The shunt field winding 22 is thus connected from the positive conductor 21 through the rheostat 51, through the field winding 22 as paralleled by the closed circuit including the resistor 56, and thence through resistor 53 to the negative conductor 21—a. At this stage of operation, resistors 54 and 55 are not connected to the field winding 22 and the field winding, being also shunted by resistor 56 is, therefore, energized to a minimum degree as a result of which the motor 20 will operate at a high speed.

As the motor 20 accelerates, the roll 4 will tend to rotate faster than the roll 5, which in the meantime is being operated by its own motor 12, which presumably has also been connected to the circuit at the same time that the main switch was originally closed. The driving motor 20 for the delivery roll 4 is, therefore, tending to speed up to deliver the paper faster than the receiving roll 5 transfers it ahead into the machine 3. As a result, the slack loop 6 will increase and the bight 7 of the loop will intercept the ray of light from the lamp 9 to the photo-cell 10. The photo-cell immediately becomes dark and as previously explained, the associated equipment 28 energizes the relay 27 from the buses 21 and 21—a. The relay 27 operates immediately to close its front contact switches 47 and 48, and to open its back contact 49. Contacts 47 and 48, when closed, will energize time relays 24 and 26, and the back contact 49, upon opening, will deenergize time relay 25.

The time relay 25 will require two seconds after its deenergization to clear the magnetic circuit and to close its back contacts 42 and 43. In the meantime, the back contacts 40 and 41 of relay 24 have opened and the contact 44 of relay 26 has closed.

The opening of the back contact 40 of time relay 24 opens the bridging circuit across the field winding 22 so that the winding may be increasingly energized. Contact 44 of time relay 26 closes to connect the resistor 55 in parallel with the resistor 53 and again increasingly energizes the field winding 22. The motor 20 thereupon tends to slow down so that the delivery roll 4 will not be moving the paper 1 as fast as the receiving roll 5 raises it from the loop and transfers it to the machine section 3.

If the bight 7 of the slack loop 6 should rise above the light line 8 within one second from the time the relay 27 was energized and motor 20 slowed down the relay 27 will become immediately deenergized by re-excitation of the photo-cell 10. The operation in that case would then follow in the same normal manner. For the present let us consider what would happen if the motor 20 should not slow down enough to permit the slack loop to rise above the line 8 within two seconds.

It will be recalled that the timing relay 25 is set to resume its deenergized position in two seconds after the main winding is deenergized. Two seconds have elapsed without the slack loop rising above the light line 8. Back contacts 42 and 43 have now closed. Back contact 43 connects an additional resistor 54 in parallel with resistor 53 and resistor 55 to increase the current to the field winding of the driving motor 20 for the delivering roll 4. The speed of motor 20 is thus diminished still further. At the same time, the closure of back contact 42 of relay 25 completes the circuit to the field winding 62 of the rheostat motor 61 and causes the motor 61 to operate the arm 60 towards the left-hand end in order to diminish the resistance in series with the field winding 22 of motor 20. The current in the shunt field winding 22 is thus further increased and the motor 20 slowed down still further. The motor 20 will finally be slowed down to a speed at which the difference in speed between the delivery roll 4 and the receiving roll 5 will raise the slack loop 6 above the light line 8.

Photo-cell 10 will thereupon become reenergized and relay 27 will become deenergized.

When relay 27 is deenergized, its contacts 47 and 48 open, and the back contact 49 closes, immediately. One second will elapse before timing relay 24 closes its back contacts 40 and 41. Two seconds will elapse before timing relay 26 will open its contact 44. Timing relay 25, however, has already instantaneously opened its back contacts 42 and 43. Thus, upon the deenergization of relay 27, rheostat motor field winding 62 was immediately deenergized and the field resistor 54 in circuit with the shunt field winding 22 was immediately disconnected. Resistor 55, however, remains still connected in parallel with resistor 53. The effect of the disconnection of the resistor 54, however, is momentarily to increase the resistance of the circuit of field winding 22. That tends to speed up motor 20. If the slack loop will now be lowered to intercept the light line 8 within one second after relay 27 was deenergized, the photo-cell will be darkened again and relay 27 will be reenergized to establish the sequence of control previously described. If, however, the low point of the slack loop 6 does not intercept the light line 8 within one second, relay 24 will resume the deenergized position as illustrated after an interval of two seconds.

When the timing relay 24 closes its back contacts 40 and 41 after those two seconds, the circuit of the field magnet winding 22 will again be controlled, as was previously described, to diminish its excitation and to cause the motor 20 to continue to accelerate and increase its speed until the slack loop 6 will lower its bight 7 to interrupt the light beam 8. During that operation, the field winding 63 of the rheostat motor will be energized to introduce resistance into the circuit of the field winding 22 to further decrease its energization. As soon as the loop 7 intercepts the beam 8, and the cell becomes dark, the relay 27 will become re-energized and the operation previously described will be again performed.

All of these operations will continue to take place as the relay 27 becomes energized and then deenergized, until the field rheostat 51 will gradually assume a balanced position. Thereafter, assuming all other conditions to be normal, the regulation of the shunt field winding 22, to raise and to lower the slack loop 6, will be governed by the fast acting time relay 26 which will operate by the opening and closing of its switch 44 to introduce resistor 55 into, and to withdraw it from, the circuit of the shunt field winding 22 for the driving motor of the delivery roll 4.

Thus, as shown and described, the operation under normal conditions will be such that the contact of only the timing relay 26 will operate to control the excitation of the shunt field winding 22, if the speed of driving motor 20 will change fast enough to change the sag in the slack loop 6 so that the bight 7 of the loop will intercept and clear the light beam 8 about once per second, as controlled by the time setting of the time relay 26. If the preliminary adjustments of the equipment have not reached their stabilized balanced positions, and the timing relay 26 cannot yet alone control the operation of the driving motor 20, the other timing relays 24 and 25 will cooperate with each other and with the field rheostat motor to establish high speed control of the excitation of the shunt field winding 22 by disconnecting the parallel resistor 54 and by shunting the field winding itself through the resistor 56.

As previously mentioned, such high speed operations will only take place until the equipment reaches a condition of balance, after which the timing relay 26 will ordinarily be able alone to control the driving motor 20 to maintain the desired slack conditions, merely by inserting the resistor 55 into, and withdrawing it from, the circuit of the shunt field winding 22.

By means of such arrangement, the relatively rugged time relay 26 is employed to control the excitation of the shunt field winding 22 while permitting the motor operated field rheostat to remain relatively stationary through a major portion of the time of operation of the machine. Since the timing relays 24, 25 and 26 are relatively inexpensive compared to the field rheostat, the frequent operations are concentrated on those inexpensive devices and the field rheostat is employed only as back-up protection to establish high speed restoration of the slack loop to a desired sag only when the single timing relay 26 is, for the time being, unable by itself to establish proper regulating control.

My invention is not to be limited to the specific devices that are illustrated nor to the particular arrangement that is shown, since equivalent devices may be employed and equivalent arrangements made without departing from the spirit and scope of the invention, as set forth in the appended claims.

I claim as my invention:

1. A control system comprising, in combination, means for delivering material, means for receiving said material, the relative positions of said delivering means and of said receiving means being such that the material is free to sag as it passes from the former to the latter, and means for maintaining an average predetermined sag, said means comprising photo-electric means for detecting the loop sag above or below the average line location, and slow restoral control means controlled thereby to provide an immediate slow restoral action upon change of the loop position relative to the average line, and fast restoral means also controlled by said photo-electric means adapted to provide a fast restoral action upon change of the loop position relative to the average line, and time limit means responsive to the operation of said photo-electric means adapted to set said fast restoral means in operation a selected time interval after the initiation of the operation of the slow restoral means.

2. A control system comprising, in combination, means for delivering material, means for receiving said material, the relative positions of said delivering means and of said receiving means being such that the material is free to sag as it passes from the former to the latter, and means for maintaining an average predetermined sag, said means comprising means for controlling the speed of delivery of the material, means for detecting the relation of the loop sag to the permitted average, loop sag control means responsive to the detecting means for controlling the speed controlling means with a slow speed initial control function, loop sag control means responsive to the detecting means for controlling the speed controlling means with a selectively higher speed control function, and time limit means adapted to delay the beginning of the operation of the last mentioned loop sag control means a selected interval of time after the beginning of the operation of the first named loop sag control means.

3. A control system comprising, in combination, means for delivering material, means for receiving said material, the relative positions of said delivering means and of said receiving means being such that the material is free to sag as it passes from the former to the latter, and means for maintaining an average predetermined sag, said means comprising means for controlling the speed of delivery of the material, detecting means for detecting the relation of the loop sag to the permitted average, first means responsive to the detecting means for controlling the speed-controlling means to slowly reestablish average sag, and second means responsive to the detecting means for quickly controlling the speed-controlling means to re-establish average sag.

4. A control system comprising, in combination, means for delivering material, means for receiving said material, the relative positions of said delivering means and of said receiving means being such that the material is free to sag as it passes from the former to the latter, and means for maintaining an average predetermined sag, said means comprising means for controlling the speed of delivery of the material, means for detecting the relation of the loop sag to the permitted average, first means responsive to the detecting means for controlling the speed-controlling means to slowly re-establish average sag, and second means responsive to the detecting means for controlling the speed controlling means to quickly reestablish average sag, and means for causing the operation of the second means only if the first means has not been effective within a predetermined time interval.

5. A control system comprising, in combination, means for delivering material, means for receiving said material, the relative positions of said delivering means and of said receiving means being such that the material is free to sag as it passes from the former to the latter, and means for maintaining an average predetermined sag, said means comprising a direct-current motor with a shunt field winding to operate the delivering means, resistance means to be added to or withdrawn from the circuit of the field winding, detecting means for detecting the relation of the loop sag to the predetermined desired average sag, and means responsive to the detecting means for successively establishing slow speed control and high speed control of the field winding by said resistance means.

6. A control system comprising, in combination, means for delivering material, means for receiving said material, the relative positions of said delivering means and of said receiving means being such that the material is free to sag as it passes from the former to the latter, and means for maintaining an average predetermined sag, said means comprising a direct-current motor with a shunt field winding to operate the delivering means, resistance means to be added to or withdrawn from the circuit of the field winding, detecting means for detecting the relation of the loop sag to the predetermined desired average sag, loop sag control means responsive to the detecting means for first establishing slow speed control of the field winding by the resistance means, time limit means also controlled by said detecting means adapted to operate a definite time interval after the operation of the loop sag control means, and further loop sag control means responsive to the time limit means adapted to establish a higher speed control of the field winding by the resistance means.

7. A control system comprising, in combination, means for delivering material, means for receiving said material, the relative positions of said delivering means and of said receiving means being such that the material is free to sag as it passes from the former to the latter, and means for maintaining an average predetermined sag, said means comprising a direct-current motor with a shunt field winding to operate the delivering means, resistance means to be added to or withdrawn from the circuit of the field winding, means for detecting the relation of the loop sag to the predetermined desired average sag, time limit means, and means responsive to the detecting means upon a departure from average adapted to first modify the resistance of the field winding circuit to establish slow restoral to average, and means responsive to the time limit means adapted to establish fast restoral, but, in view of the control effect of the time limit means, operative only after the slow restoral means have operated a predetermined interval of time, and then only if restoral has not been established within that time.

8. A control system comprising, in combination, means for delivering material, means for receiving said material, the relative positions of said delivering means and of said receiving means being such that the material is free to sag as it passes from the former to the latter, and means for maintaining an average predetermined sag, said means comprising a direct-current motor with a shunt field winding to operate the delivering means, resistance means to be added to or withdrawn from the circuit of the field winding, means for detecting the relation of the loop sag to the predetermined desired average sag, a motor-operated rheostat in the field winding circuit in addition to said resistance means, first means responsive to the detecting means upon departure of the sag from average for controlling the resistance means to establish a small modifying action on the field winding excitation, second means responsive to the detecting means for controlling both the resistance means and the motor-operated rheostat to establish a large modifying action on the field winding excitation to establish quick restoral of the sag, and time limit means adapted to delay the operation of said second means a definite interval of time after the operation of the first means responsive to the detecting means.

9. A control system comprising, in combination, means for delivering material, means for receiving said material, the relative positions of said delivering means and of said receiving means being such that the material is free to sag as it passes from the former to the latter, and means for maintaining an average predetermined sag, said means comprising a direct-current motor with a shunt field winding to operate the delivering means, resistance means to be added to or withdrawn from the circuit of the field winding, means for detecting the relation of the loop sag to the predetermined desired average sag, a motor-operated rheostat in the field winding circuit in addition to said resistance means, a resistor to be connected in shunt relation to the field winding, first means responsive to the detecting means upon departure of the sag from average for controlling the resistance means in the field circuit to establish a small modifying action on the field winding excitation, second means responsive to the detecting means for controlling the resistance means in the circuit of the shunt field winding, and the resistor to shunt the field winding, and the motor-operated rheostat to establish a large modifying action on the excitation of the field winding to establish quick restoral of the sag, and time limit means for causing the operation of the second means only after a certain time interval of operation of the first means.

10. A control system comprising, in combination, means for delivering material, means for receiving said material, the relative positions of said delivering means and of said receiving means being such that the material is free to sag as it passes from the former to the latter, and means for maintaining an average predetermined sag, said means comprising a direct-current motor with a shunt field winding to operate the delivering means, resistance means to be added to or withdrawn from the circuit of the field winding, means for detecting the relation of the loop sag to the predetermined desired average sag, and means responsive to the detecting means upon a departure from average for first modifying the resistance of the field winding circuit to establish slow restoral to average, means for shunting the field winding to diminish the current in the winding and to diminish the excitation of the winding, time limit means, and means responsive to said time limit means and operative to establish fast restoral only after the slow restoral means have operated a predetermined interval of time, and then only if restoral has not been established within that time, said fast restoral means including means for actuating the means to shunt the field winding.

11. A control system comprising, in combination, means for delivering material, means for receiving said material, the relative positions of said delivering means and of said receiving means being such that the material is free to sag as it passes from the former to the latter, and means for maintaining an average predetermined sag, said means comprising a direct-current motor with a shunt field winding to operate the delivering means, resistance means to be added to or withdrawn from the circuit of the field winding, means for detecting the relation of the loop sag to the predetermined desired average sag, and means responsive to the detecting means upon a departure from average for first modifying the resistance of the field winding circuit to establish slow restoral to average, by slightly increasing the resistance of the circuit of the shunt field winding, time limit means, and means responsive to said time limit means operative if the slow restoral means have not effected restoral within a predetermined interval of time, to short-circuit the field winding to quickly decrease its excitation and thereby establish fast restoral.

JAMES G. STEPHENSON.